UNITED STATES PATENT OFFICE.

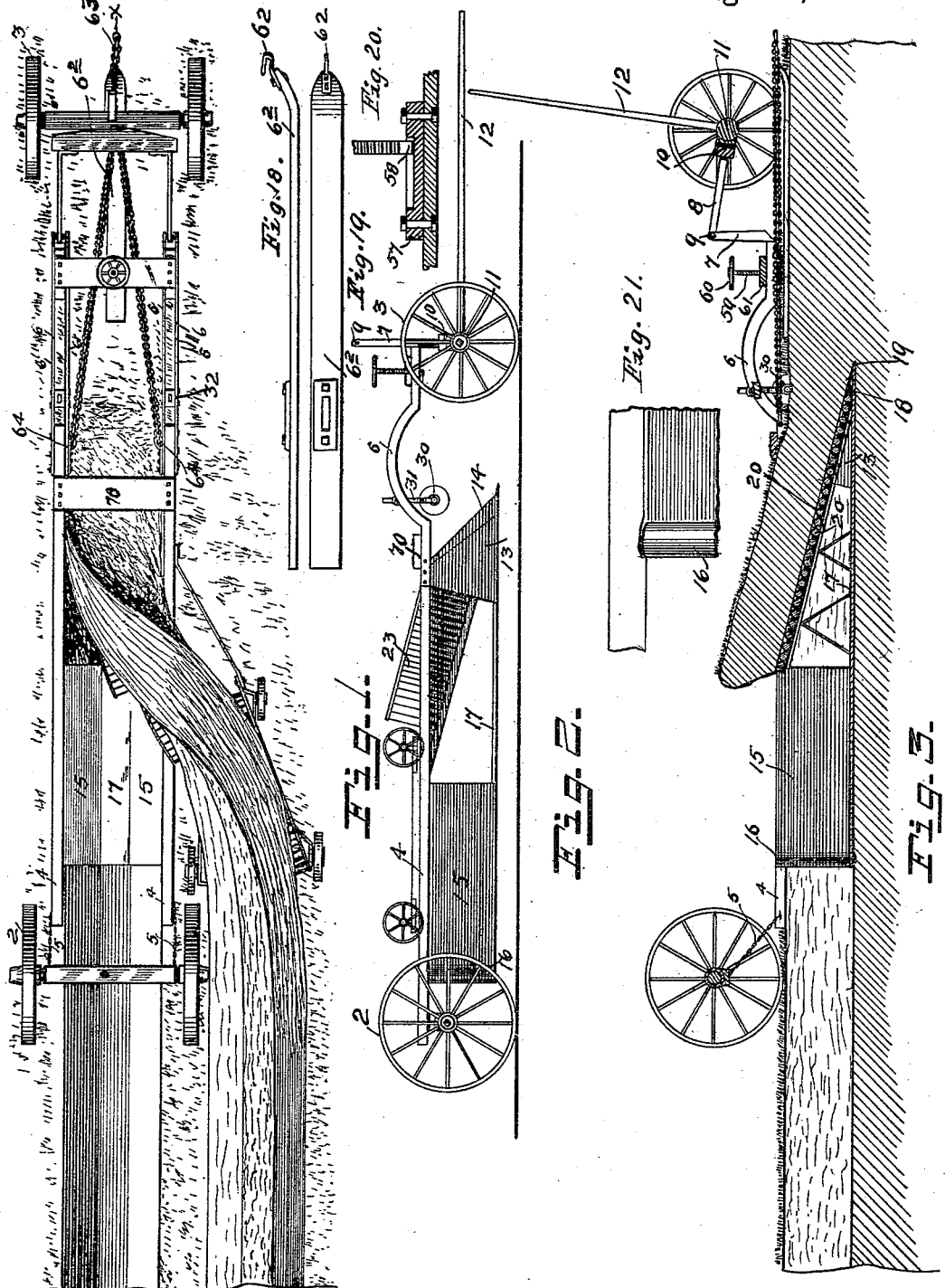

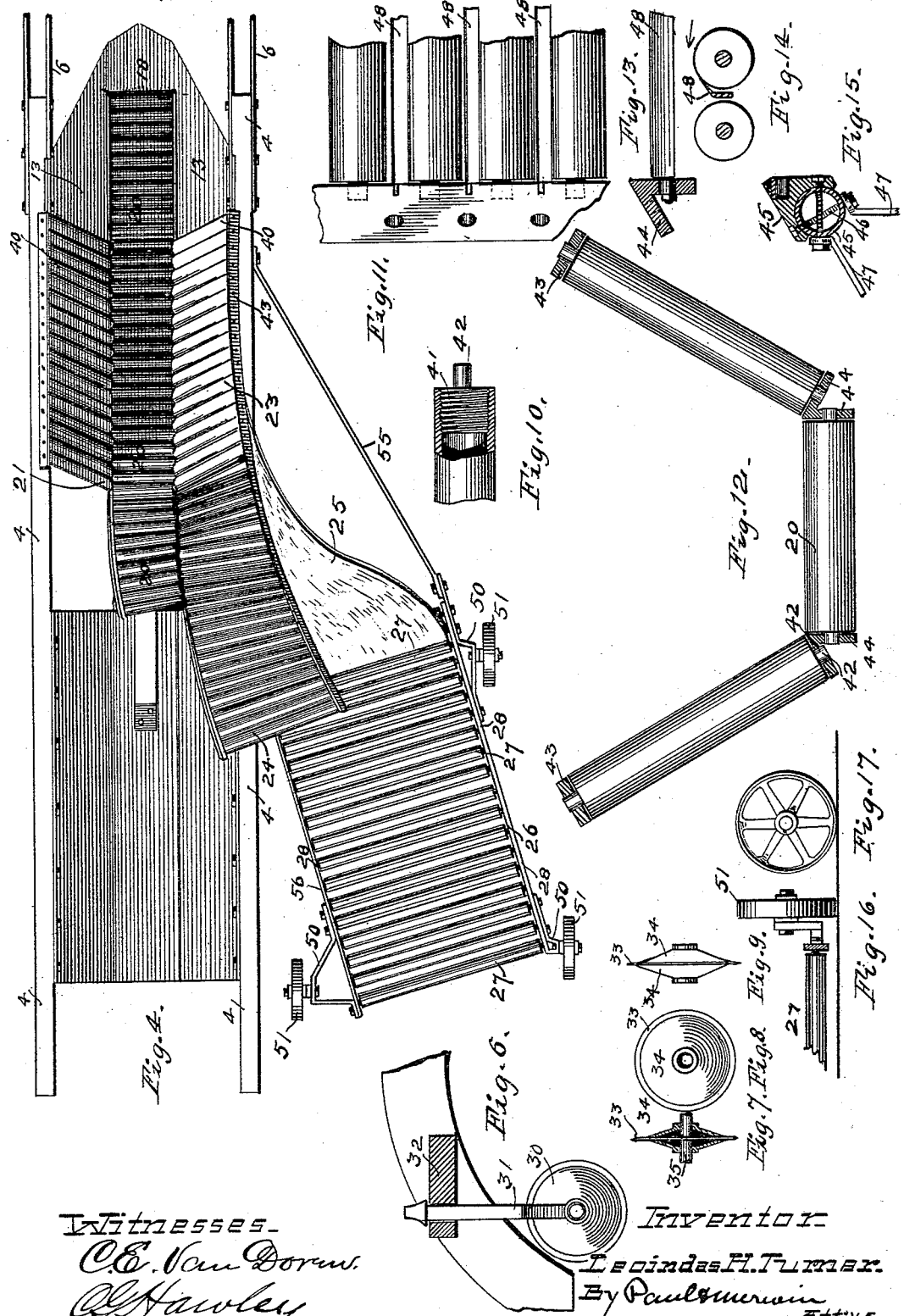

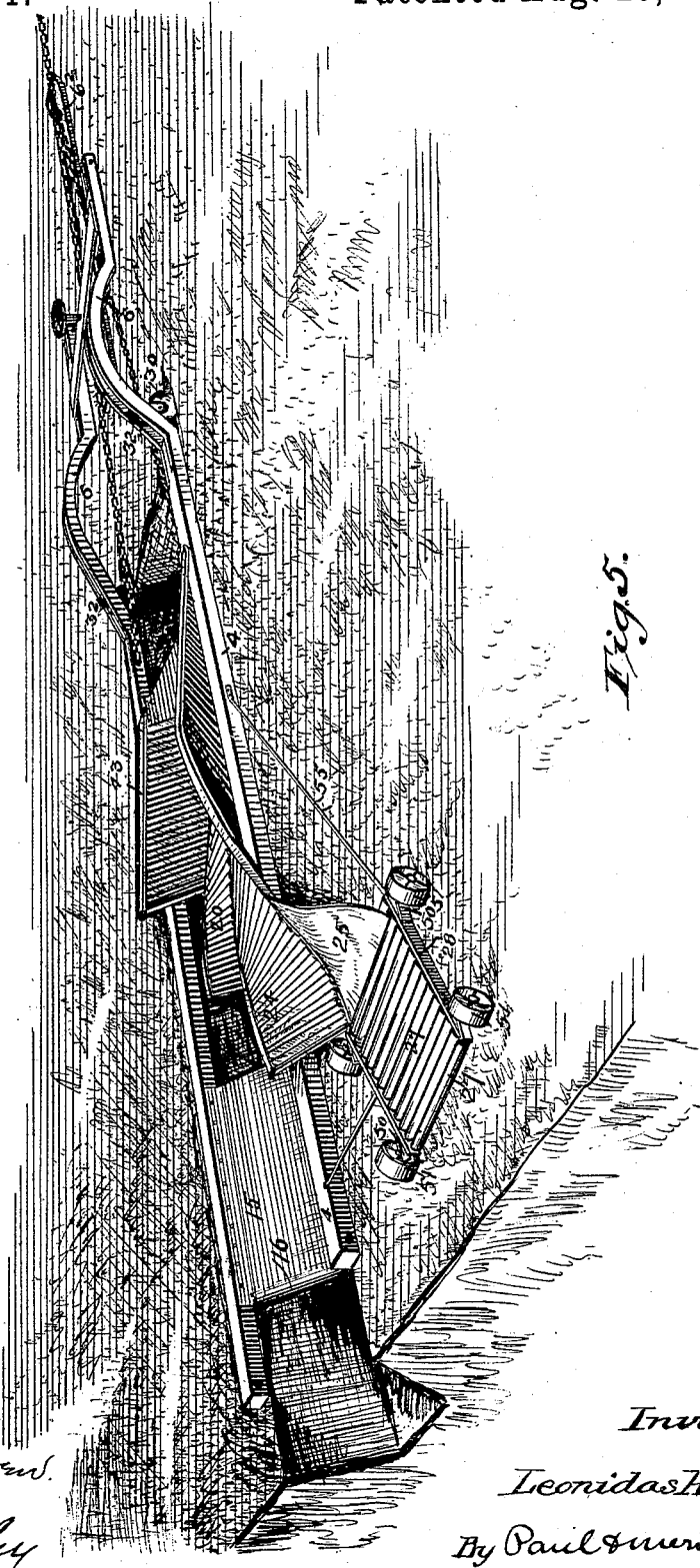

LEONIDAS H. TURNER, OF MINNEAPOLIS, MINNESOTA.

DITCHING-MACHINE.

SPECIFICATION forming part of Letters Patent No. 458,201, dated August 25, 1891.

Application filed January 30, 1891. Serial No. 379,679. (No model.)

*To all whom it may concern:*

Be it known that I, LEONIDAS H. TURNER, of Minneapolis, in the county of Hennepin and State of Minnesota, have invented certain Improvements in Ditching-Machines, of which the following is a specification.

My invention relates to ditching-machines of the class employed for making shallow drain-ditches at the sides of roads or through low swampy tracks of land; and the object of the invention is to provide a machine adapted to be operated by a capstan, and the course of which may be directed either in an absolutely-straight line or in any curve desired, which may be operated with a power smaller or at a greater speed than former machines, which will leave smooth sides and bottom in the ditch, and which will pile the dirt excavated at a point farther away from the ditch than machines heretofore devised.

The invention consists in a machine adapted to be loaded upon road-wheels and having friction-roller mold-boards provided with a sharp metal prow or share of the required form and tilted turning-plates, whereby the turf and dirt is laid evenly on the ground to one side of the machine, the whole being supported by long ground beams or sills; and the invention consists, further, in various novel constructions and combinations hereinafter described, and particularly pointed out in the claims, and which will be more readily understood by reference to the accompanying drawings, in which—

Figure 1 is a plan view of the machine embodying my invention, the same being represented in operation. Fig. 2 is a side view thereof prepared for the road. Fig. 3 is a section on the line $x\ x$ of Fig. 1. Fig. 4 is a detail plan view of the friction-roller mold-boards and other principal parts of the machine. Fig. 5 is a general perspective view showing the machine in the ground, the dirt being dug away in the forward part of the machine to more clearly show the construction thereof. Figs. 6, 7, 8, 9, 10, 11, 12, 13, 14, 15, 16, 17, 18, 19, 20, and 21 are details.

As shown in the drawings, the machine as a whole is adapted to be mounted upon the road-wheels 2 and 3, the sills 4 extending between the same, and the pillows upon the axles being high enough to raise the lower part of the machine off the ground. The hind wheels are secured to the rear ends of the sills when resting on the ground by short chains 5, so that the wheels drag along after the machine. The forward ends of the sills are formed by the arch-straps 6, the front ends of which stand a few inches above the level of the under sides of the sills, being supported on the long shoe or runner $6^2$, resting on the ground. As shown in Fig. 3, straps or brackets extend up from the front ends of the sills and are pivoted to the ends of the arms 8 at points 9. These arms are secured at their lower ends upon the pillow 10, pivoted on the axle 11 of the forward wheels, with which the tongue 12 connects in the usual manner. By pulling down on the tongue the forward end of the machine may be raised off the shoe 6 and swung over the axle 11, where it may be secured in position by any desired means. These wheels do away with the necessity of carrying a special wagon through the country to haul the machine from place to place. The prow or shoe 13 is made of boiler-iron or steel and has a supplementary sharpened steel edge or knife 14, as shown.

The shoe and its knives are arranged in the desired cross-section form of the ditch to be dug, which, as shown, is usually of slanting sides and narrow bottom. The guide-plates 15, fastened at their lower edges to the plank 17, are also made of boiler-iron, being provided between the rear ends of the sills and having the same form as the shoe 13, and serve to prevent the rear end of the machine from pushing, or, so to speak, drifting to one side. I provide the outwardly-distended beads 16 in the rear edges of these plates 15 to smooth and compress the sides of the ditch as the machine is drawn along. These beads 16 are shown most clearly in Figs. 1, 2, and 21, and also in the perspective view. The stout board or plank 17 extends between and across the lower edges of the shoe-plates 13 and those of the plates 15 to strengthen the lower part of the machine. As shown in the sectional Fig. 3, a short slanting plate 18 extends a little distance back from the end 19 of the prow, and the dirt, as it is cut up by this plate, is carried above the surface of the ground by the horizontal friction-rolls 20, provided in the slanting bottom 21, supported by suitable braces, as 22, extending from the plank 17 or the sills. The dirt cut out has a V shape, and its sides are carried by the outwardly flaring or slanted friction-roll side-boards 23. (Shown most clearly in Fig. 4.) As the strip or wedge of soil passes up the incline, it is gradually turned by the tilting bottom formed by the rolls 20, which tilt forward as they approach the top and also toward the right-hand side plate, which in turn gradually lowers at its upper edge and rises along the lower edge, so that at the end 24 of the side 23 the rollers stand at an angle opposite that of the forward rollers in the right-hand slanting side-board, thereby turning the dirt on its side and laying it over upon the guide-plate 25, which catches the strip of dirt and gradually lets it slide off and down upon the roller-plate wagon or truck 26. This truck is provided with a number of friction-rolls 27, secured in bearings in the side bars 28. The body and rollers of this low truck are set at a slight angle to the sills 4, so as to carry the strip of sod a considerable distance to one side thereof before depositing it sod side down on the ground, the strip having been exactly turned over between the prow of the machine and the truck. The dirt is thus taken out of the ground and deposited from a foot to two feet away from the side of the ditch. The forward edges of the prow of my machine, instead of being slanted backward and down, as usual, are slanted forward and down, thereby insuring the cutting of all roots and preventing the riding up of the machine to pass over them. In order to make the cutting of the prow-knives easy, I provide a double-cone colter 30 on each side of the machine and adapted to cut a wide groove just in advance of the knives, thereby doing away with the resistance of the thick sod and grass. These colters are provided on a bar 31, movably held in the eye-blocks 32 between the sill-straps 6, so that upon striking a stone or root the colters will yield upwardly instead of being broken. The colters, as shown in Figs. 7, 8, and 9, each consist in the ordinary thin-edge colter 33, having on either side the cones or cups 34, secured on the colter-shaft 35, whereby a sharp cutting-edge is provided, while the double cone serves to press the earth away on both sides.

In my machine the strip of dirt is immediately lifted by the short plate 18 onto the rollers 20 in the slanting or upwardly-inclined body 21, thereby greatly reducing the friction between the sides of the strip and the ditch from which it is cut. Further, the dirt is carried up to a level with the ground before being turned, whereby the binding with the side of the ditch is avoided. The machine progressing still farther, the dirt moves onto the friction-roll 40 in the sides 23, and after leaving the machine proper and the abruptly-inclined plate 25 falls on the roller-truck having the friction-rolls 27 and from thence to the ground. The friction rolls or rollers are made of gas-pipe, as shown in Fig. 10, having the spindle-studs 41, provided with the spindles 42, shrunk or screwed into the ends of the pipe. The frames for the sides and bottom of the roller-plates may be made in any desired way; but I preferably employ the forms shown in Figs. 11 to 15. Fig. 12, showing a transverse section through the main body of the machine, illustrates the notched or perforated plates or straps 43 as forming bearings for the upper ends of the side rollers, while the lower bearings for the said rollers and the rollers 20 are shown as angle plates or bars 44, having suitable openings for the spindles 42. I sometimes strengthen the strips 44 by means of lengths of wrought-iron pipe or wood 45, bolted thereto, as shown in Fig. 15. For convenience the bolts 46, securing the pipe to the strips, are made to hold the ends of the brace-rods 47, which in practice extend from the several parts of the machine to the sills 4 or the heavy plank 17. I secure the strips 43 and 44 firmly together by means of the scraper-knives 48, having their ends firmly bolted or otherwise secured in said strips. These scraper-knives also serve, as shown in Figs. 14 and 11, to scrape the dirt from the rolls as they are rotated by the strip passing over them, thereby preventing the rolls from clogging and becoming inoperative. As shown in Fig. 14, the main cross-bar portions of these scraper-rods 48 are placed as close as possible to the roller next in advance, so that the dirt does not fall down between the rollers, but is taken up thereby and carried off the machine. The roller-truck 26, being set at an angle with the sills 4, is necessarily provided with angle-blocks or brackets 50, by means of which the truck-wheels are thrown into line with the sills 4, as shown in Figs. 14 and 16.

The forward end of the truck is braced and connected with the sills by the iron strap 55, while the rear portion of the truck is held away therefrom by a brace 56. Either or both of these braces may be made adjustable, to the end that the position of the truck with respect to said sills may be altered to carry the dirt to a greater or less distance from the edge of the ditch. Both of these braces are easily removable, so that the truck may be detached from the sills and loaded on the top of the same, as shown in Fig. 2, when the machine is prepared for transportation. Fig. 16 shows that the brackets 50 depend from the short axles of the wheels 51 to bring the rolls 27 as close to the ground as possible.

Where a good solid sod is found, a short shoe or runner might be substituted in place of the long runner shown in the drawings; but for general work, and especially in soft marshy ground, I have used the long runner as alone sufficient to uphold the end of the machine and prevent its being buried in the ground. The rear end of the shoe is provided with the slotted block 57, bolted upon the top of the shoe and adapted to engage the lower end of the screw 59, having the cross-bar or wheel 60 and extending through the block 61, provided between the ends of the arch-straps 6. The forward end of the shoe is provided with a staple and hook 62, adapted to engage the draft-chain 63, extending back in two legs having their rear ends fastened in hooks or eyes 64, provided on the sills. I provide a heavy brace 70 between the sills at points where chains are attached. By use of the hook at the end of the shoe and by making the slot in the block 57 long enough, so that the screw does not strike the end thereof, I relieve the screw 59 from all tension which would otherwise result from the back-pressure of the shoe thereon, owing to its friction with the ground.

In the use of my machine the same is carried upon the tract of land to be drained and lowered thereon at the starting-point, the prow being started into the ground. If it is desired to cut the ditch in a gradual curve, one of the legs of the draft-chain 63 is shortened, so that the pull is exerted more on one side of the machine than on the other. If, on the other hand, a perfectly-straight ditch is to be cut, the chains are left of equal length. A strong rope is fastened on the end of the draft-chain 63 and the forward end is carried off across the piece of land and wound upon a horse-power capstan fixed upon solid ground. The capstan being then operated the machine is drawn forward slowly until the sills and the shoe 62 rest squarely on the ground. By means of the screw 59 the depth at which the machine is to work is easily determined, after which the machine may be drawn ahead as rapidly as the qualities of the ground will admit. It will be seen that in a given piece of land my machine will have a much greater speed than machines heretofore devised because of the great reduction of friction between the excavated strip of earth and the parts of the machine and the consequent ability to use a larger capstan. The machine is, moreover, extremely durable, as the speed of the rollers is too slow to cause wearing of the bearings and spindles thereof.

By the use of my machine a clean smooth ditch having compressed sides is made and the earth deposited on either side of the ditch desired in a long even pile and at a convenient distance from the edge thereof.

It is obvious that it would be mere duplication of parts to arrange a turf-turning side and bottom in connection with the other side or sill of the machine, thereby adapting the machine to cut a ditch twice as wide and throw a line of excavated dirt and turf on each side thereof.

Having thus described my invention, I claim as new and desire to secure by Letters Patent—

1. The combination, in a ditching-machine, of the prow having the forwardly-slanting sides with continuations thereof extending upward and provided with the friction-rolls, the upper portion of said sides arranged to twist and to invert the strip of earth excavated and to deposit the same on the ground at one side of the machine, substantially as described.

2. The combination, in a ditching-machine, of sills with the prow having the forwardly-inclined cutting-edges and the flaring sides, the inclined sides and the bottom extending upward and back from said prow, one of the sides and the bottom being gradually turned or tilted, said sides and bottom provided with friction-rolls and the concave guide 15, conforming to the shape of the ditch, substantially as described.

3. The combination, in a ditching-machine, of sills with a shoe arranged in connection with the forward ends thereof, the plate 15, the part 13, having the share 14, the slanting sides and bottom extended back from said shoe, the friction-rolls arranged therein, the said sides and bottom being arranged to turn the strip of earth excavated, and a roller-truck arranged to receive said dirt and to deposit the same on the ground at one side of the ditch, substantially as described.

4. The combination, in a ditching-machine, of the sills 4, with the supporting-shoe for the forward ends thereof, the prow, the slanting bottom extending back therefrom, and the draft-chain 63, having two legs or strands extending back to said sills and attached thereto at a point back of said shoe and above said prow, whereby the pull upon the machine is more accurately directed, substantially as described.

5. The combination, in a ditching-machine, of the sills 4, with the arch-straps 6, a supporting shoe or slide 62 therefor, eye-blocks 32, colters 30, and the colter arms or rods 31, passing through said eye-blocks, substantially as described.

6. The combination, with the sills 4 and the forward strap ends thereof, of the cross-block 61, with the screw 59, the long shoe 62, the slotted block thereon engaging the lower end of said screw, the draft-chain 63, secured to said sills, and means on the forward end of said shoe for engaging said draft-chain, substantially as described.

7. The combination, in a ditching-machine, of the bottom and side mold-boards with the sills, said mold-boards provided with and made up of friction-rollers, whereby the friction between the machine and the ground is minimized, substantially as described.

8. The combination, in a ditching-machine, of the sills 4, with the plank 17, the prow, the guide-plates 15, and the compressing-beads therein, substantially as described.

9. The combination of the side and the bottom friction-rolls having spindles 42, the plates or straps 43, the angle-plates 44, and scrapers provided between said rolls, the ends of said scraper-rods being secured in said plates 43 and 44, whereby said rods serve as tie-beams and braces, substantially as described.

10. The combination, with the plates 44, of the beams or pipe or pipes 45, provided therewith to strengthen the same, substantially as described.

11. The combination, with the sills 4, of the truck 26, having its bed made up of rolls 27, with the angle-brackets 50 and the wheels 51, secured thereon, as described.

12. The combination of the sills with the curved side and bottom, and the roller-truck secured to one of said sills and adapted to receive the dirt carried over the side of the machine by said curved side and bottom, whereby sidewise movement of the machine is prevented, substantially as described.

In testimony whereof I have set my hand this 24th day of January, 1891.

LEONIDAS H. TURNER.

In presence of—
C. G. HAWLEY,
T. S. LYON.